Feb. 4, 1964 J. G. W. LEE 3,120,654
NARROW BEAM RADIATION SCANNED PATTERN ALARM SYSTEM
Filed Oct. 24, 1960 2 Sheets-Sheet 1
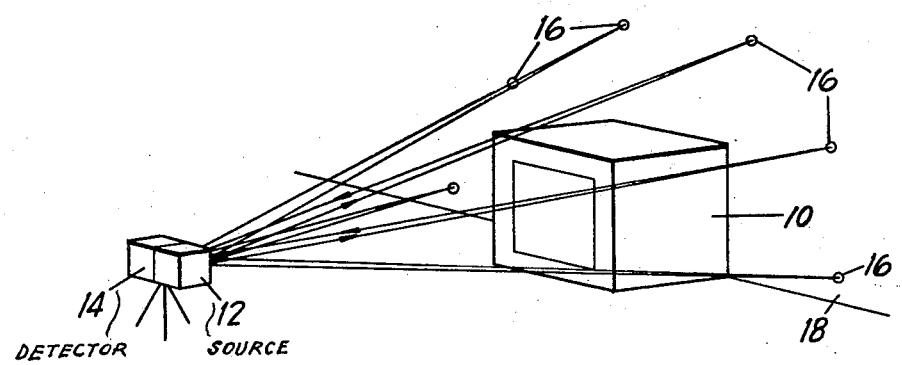
FIG. 1
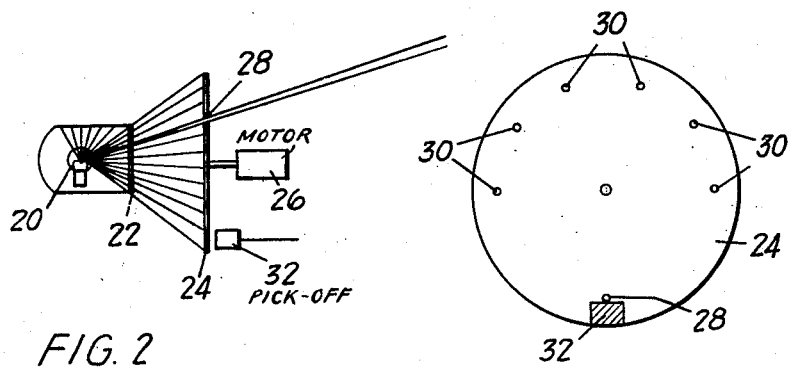
FIG. 2
FIG. 3
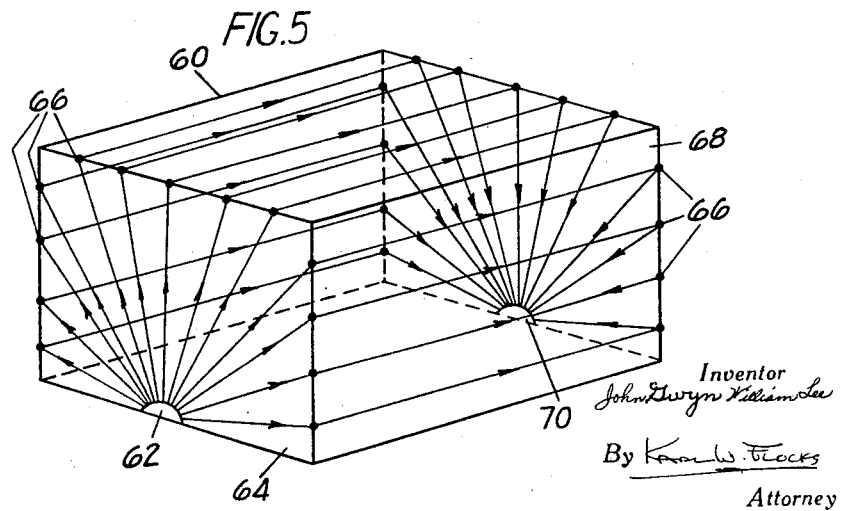
FIG. 5
Inventor
John Gwyn William Lee
By [signature]
Attorney

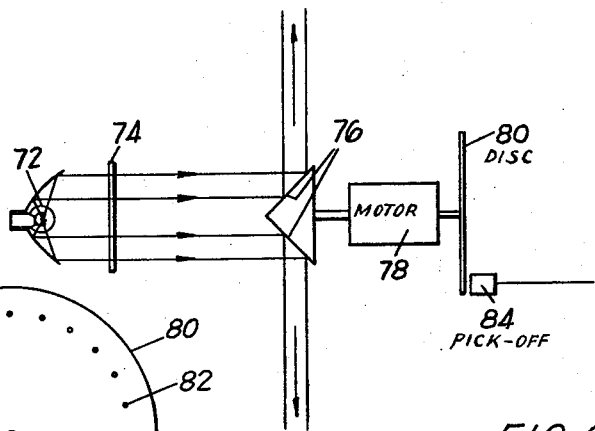
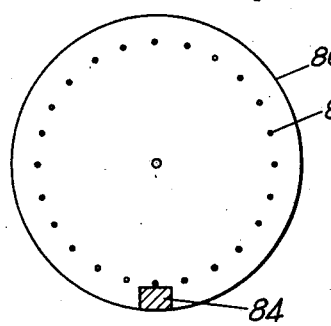
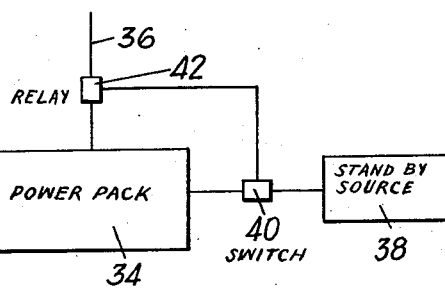
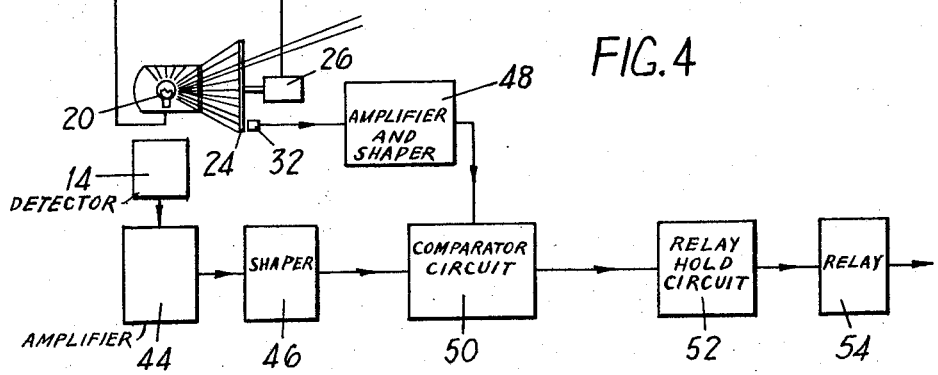

United States Patent Office 3,120,654
Patented Feb. 4, 1964

3,120,654
NARROW BEAM RADIATION SCANNED
PATTERN ALARM SYSTEM
John Gwyn William Lee, Welwyn, England, assignor to
The de Havilland Aircraft Company Limited
Filed Oct. 24, 1960, Ser. No. 64,628
Claims priority, application Great Britain Nov. 5, 1959
16 Claims. (Cl. 340—258)

This invention relates to alarm systems in which the interruption of a radiation beam is used to initiate an alarm.

In order effectively to protect a large space by such an alarm system, it is necessary for there to be a number of radiation beams around the space, sufficiently closely spaced to preclude entry without interruption of a beam. This can be achieved by the use of a single source of radiation and a reflecting optical system, but the number of reflections necessary reduced the potical efficiency to such an extent as seriously to compromise the sensitivity of the system. Alternatively, a plurality of source of radiation may be used, but this necessitates a high initial expenditure as well as high running costs.

According to the invention, therefore, an alarm system comprises an alarm, a source of radiation, a motor, a device connected to the motor to be driven thereby to produce a rotating beam of narrow width from the source of radiation, a radiation detector, stationary reflectors in the path of the beam to reflect the beam as a series of raidation pulses to the radiation detector, means driven by the motor to produce a series of electrical signals corresponding to the radiation pulses, and a comparator to compare the electrical signals with output signals derived from the detector due to radiation and to initiate the alarm when the output signals are interrupted.

The invention extends to an alarm protection system for a space bounded in part by two surfaces inclined to each other, comprising an alarm, a source of radiation associated with one surface, a motor adjacent said source, a device connected to said motor to be driven thereby to produce a rotating beam of radiation of narrow width, a radiation detector adjacent said source, stationary reflectors associated with the other surface in the path of the beam to reflect the beam as a series of radiation pulses to said detector, means connected to said motor to be driven thereby to produce a series of electrical signals corresponding to the radiation pulses, and a comparator to compare the electrical signals with output signals derived from said detector due to radiation and to initiate the alarm when said output signals are interrupted.

Another object of the invention is an alarm protection system for a space bounded by two end surfaces and a base surface transverse thereto, comprising an alarm, a source of radiation associated with the base surface and one end surface, a motor adjacent said source, a device connected to said motor to be driven thereby to produce two rotating beams of radiation of narrow width in opposite directions, a radiation detector associated with the base surface and the other end surface, stationary reflectors associated with the other end surface around said detector on one side thereof, stationary reflectors associated with the one end surface around said source on one side thereof in the path of the beams to reflect the beams as a series of radiation pulses to the stationary reflectors associated with the other end surface and then to said detector, means connected to said motor to be driven thereby to produce a series of electrical signals corresponding to the radiation pulses, and a comparator to compare the electrical signals with output signals derived from said detector due to radiation and to initiate the alarm when said output signals are interrupted.

In the accompanying drawings:

FIGURE 1 is a perspective view of the system applied to the protection of a safe;

FIGURE 2 is a diagrammatic side view of part of the system of FIGURE 1;

FIGURE 3 is a front view of part of FIGURE 2;

FIGURE 4 is a block diagram of the system of FIGURE 1;

FIGURE 5 is a perspective view of the system applied to the protection of a room;

FIGURE 6 is a diagrammatic side view of part of the system of FIGURE 5; and

FIGURE 7 is a front view of part of FIGURE 6.

In the first embodiment, the invention is used to protect a safe 10 (FIGURE 1). A source 12 of radiations is set up facing the safe 10 and adjacent a radiation detector 14. A set of stationary reflectors 16 is arranged around the safe 10 on a wall 18 to receive radiations from the source 12 and reflect them to the detector 14. The source 12 comprises a lamp 20 (FIGURE 2) sending light through an optical filter 22 which allows to pass only radiations of a predetermined range of wavelengths from $2.2\mu$ to $2.7\mu$. These fall on a disc 24 which is rotated by a motor 26. An aperture 28 in the disc allows a narrow beam of radiations to pass through the disc and this is rotated by rotation of the disc, falling in turn upon each of the reflectors 16.

On the disc 24 (FIGURE 3) are magnetised portions 30 corresponding to the reflectors 16. Each magnetised portion 30 comes adjacent a pick-off 32 as radiations through the aperture 28 fall on the corresponding reflector 16.

The lamp 20 and motor 26 are both energised from a power pack 34 (FIGURE 4) supplied from the mains 36. The power pack 34 can be supplied from a standby power supply 38, which is switched in by a switch 40 operated by a relay 42 sensitive to mains failure.

Radiation pulses derived from the reflectors 16 and falling on the detector 14 cause the latter to produce signals which are amplified in an amplifier 44 and shaped into square pulses in a shaper 46. Signals from the pick-off 32 due to the magnetised portions 30 are amplified and shape in a circuit 48 and the signals from the shaper 46 and circuit 48 are combined in a comparator circuit 50. The output from the circuit 50 is taken to a relay hold circuit 52 which controls the operation of a relay 54. The relay 54 is connected to an alarm circuit (not shown) so as to disarm the circuit until the relay is de-energised.

In operation, the lamp 20 is energised and the motor 26 drives the disc 24. A rotating radiation beam of narrow width is obtained through the aperture 28 and falls successively upon the reflectors 16 in its path. The beam is reflected to the radiation detector 14 in the form of a series of radiation pulses. At the same time signals are produced by the magnetised portions 30 on the disc 24 in the pick-off 32. The signal and radiation pulses are compared in the comparator circuit and provided that the signals derived from the detector occur during the signals derived from the pick-off, the energisation of the relay 54 continues.

If the beam is interrupted during its rotation, a signal will be missing from the detector 14 and the relay hold circuit 52 will be broken to release the relay 54 to initiate the alarm.

It will be understood that two apertures may be formed in the disc so that two rotating beams are obtained. In this case a second set of magnetised portions on the disc are required, but a symmetrical system can be obtained.

In the second embodiment, the invention is used to protect a room 60 (FIGURE 5). A source 62 of radiations is set up at the centre of the bottom edge of one end wall 64. There is a system of stationary reflectors 66 along the side and top edges of the one end wall 64 and the opposite end wall 68 to receive radiations from the source 62 and reflect them to a radiation detector 70 at the centre of the bottom of the end wall 68.

The source 62 comprises a lamp 72 (FIGURE 6) sending light through an optical filter 74 which allows to pass only radiations of a predetermined range of wavelengths from $2.2\mu$ to $2.7\mu$. These fall on a pair of reflectors 76 at right angles to each other and at 45° to the beam radiation. The reflectors 76 are rotated by a motor 78 which also rotates a disc 80. The disc 80 has magnetised portions 82 which are scanned in turn by a pick-off 84. There are two magnetised portions 82 for each pair of reflectors 66, corresponding to the radiation beams from the two reflectors 76.

There is an electrical comparator circuit similar to that shown in FIGURE 4.

In operation, the lamp 72 is energised and the motor 78 drives the reflectors 76 and disc 80. Two rotating radiation beams of narrow width are obtained from the reflectors 76 and fall successively upon the reflectors 66 in their path.

Each beam is reflected to the radiation detector 70 in the form of a series of radiation pulses, the two series producing a continuous set of pulses. At the same time signals are produced in the pick-off 84 by the magnetised portions 82 on the disc 80. The signals and radiation pulses are compared in the comparator circuit and provided that the signals derived from the detector occur during the signals derived from the pick-off, the alarm circuit is not energised.

If either beam is interrupted during its rotation, a signal will be missing from the detector 70 and the alarm will be initiated.

It will be understood that the range of wavelengths of the radiation pulses need not be that stated, but is preferably within the infra-red range, as radiation sensitive cells for this range are available. For the sake of simplicity it is also desirable to keep the wavelength within the near-visible range of wavelengths. A range of $0.8\mu$ to $2.7\mu$ is particularly satisfactory.

I claim:

1. An alarm system comprising an alarm, a radiation source, means for deriving from said source a beam of radiation of narrow width, a motor, scanning means drivenly connected to said motor to cause said derived beam to follow a scanning path, a plurality of stationary reflectors disposed in said scanning path to reflect radiation when illuminated by said beam, a radiation sensitive detector disposed in the path of radiation reflected from said stationary reflectors to provide an electrical output signal when illuminated with reflected radiation, reference signal generating means drivenly connected to said motor and operable to provide an electrical output signal each time said beam is directed towards one of said stationary reflectors by said scanning means and alarm initiating means electrically connected to the output of said detector and said reference signal generating means to initiate said alarm upon the occurrence of a reference signal in the absence of a detector output signal.

2. An alarm system comprising an alarm, a radiation source, a rotatable apertured shutter disposed in the path of radiation from said source and mounted for rotation about an axis, the aperture in said shutter being dimensioned to limit the radiation passed thereby to a beam of narrow width and the aperture being radially spaced from said axis, a motor drivingly connected to said shutter to rotate the shutter about said axis and to cause the beam of light passed by said aperture to follow a scanning path, a plurality of stationary reflectors disposed in said scanning path to reflect radiation when illuminated by said beam, a radiation sensitive detector disposed in the path of radiation reflected from said stationary reflectors to provide an electrical output signal when illuminated with reflected radiation, reference signal generating means drivenly connected to said motor and operable to provide an electrical output signal each time said beam is directed towards one of said stationary reflectors by said scanning means and alarm initiating means electrically connected to the output of said detector and said reference signal geneating means to initiate said alarm upon the occurrence of a reference signal in the absence of a detector output signal.

3. An alarm system according to claim 2 wherein said reference signal generating means is operated by said shutter.

4. An alarm system according to claim 2 wherein said reference signal generating means comprises means carried by the shutter and displaceable past a reading location to generate an output signal in synchronism with the direction of the radiation beam towards each reflector.

5. An alarm system according to claim 2 wherein said reference signal generating means comprises a stationary pick-off and portions of magnetised material carried by the shutter and displaceable past the pick-off to generate an output signal, the magnetised portions corresponding in number to the number of reflectors and being angularly disposed about said axis to generate an output signal in said pick-off each time the radiation beam is directed towards one of said reflectors.

6. An alarm system comprising an alarm, a radiation source, means disposed in the path of radiation from said source to pass radiation in the form of a narrow beam, a rotatable reflector having a reflective surface inclined to and in the path of said beam, a motor drivingly connected to said rotatable reflector to rotate said reflector about an axis and to cause said beam to follow a scanning path, a plurality of stationary reflectors disposed in said scanning path to reflect radiation when illuminated by said beam, a radiation sensitive detector disposed in the path of radiation reflected from said stationary reflectors to provide an electrical output signal when illuminated with reflected radiation, reference signal generating means drivenly connected to said motor and operable to provide an electrical output signal each time said beam is directed towards one of said stationary reflectors by said scanning means and alarm initiating means electrically connected to the output of said detector and said reference signal generating means to initiate said alarm upon the occurrence of a reference signal in the absence of a detector output signal.

7. An alarm system according to claim 6 wherein said reference signal generating means comprises a rotatable member drivenly connected to said motor.

8. An alarm system according to claim 6 wherein said reference signal generating means comprises a rotatable member drivenly connected to said motor for rotation about an axis, a plurality of magnetised portions carried by said rotatable member and augularly disposed about the axis of rotation of said member and a stationary pick-off disposed in proximity to said rotatable member and operable to produce a reference output signal when one of said magnetised portions is moved past the pick-off by the rotatable member.

9. An alarm system comprising an alarm, a radiation source, means disposed in the path of radiation from said source to pass radiation in the form of a narrow beam, a rotatable reflector having a reflective surface inclined to and in the path of said beam, a rotatable member, a pick-off disposed in proximity to said rotatable member, a plurality of magnetised portions on said member disposed angularly about the axis of rotation of said member and operable to generate an electrical reference output signal in said pick-off when displaced past the pick-off by rotation of said member, a motor drivingly connected to said rotatable reflector to cause said narrow beam to follow a scanning path and to said rotatable member to rotate the member, a plurality of stationary reflectors disposed in said scanning path for illumination by said scanning beam each time a reference output signal is generated, a radiation sensitive detector disposed in the path of radiation reflected from said stationary reflectors to provide an electrical output signal when illuminated by radiation reflected from said stationary reflectors and alarm initiating means electrically connected to the output of said detector and said pick-off and responsive to the occurence of a reference signal in the absence of the detector output signal to initiate said alarm.

10. An alarm system comprising an alarm, a radiation source, means disposed in the path of radiation from said source to drive a plurality of radiation beams of narrow width, a motor drivingly connected to said beam deriving means to cause each derived beam to follow a scanning path, a plurality of stationary reflectors disposed in each scanning path, a radiation sensitive detector disposed in the path of radiation reflected by said stationary reflectors to provide an output signal when illuminated with reflected radiation, reference signal generating means driven by said motor to generate an electrical reference signal each time one of said radiation beams is directed towards one of said stationary reflectors and alarm initiating means electrically connected to the output of said detector and said reference signal generating means to initiate said alarm upon the occurrence of a reference signal in the absence of a detector output signal.

11. An alarm system according to claim 10 wherein said beam deriving means comprises a rotatable member having a plurality of reflective surfaces disposed in the path of and inclined to radiation from said source.

12. An alarm system according to claim 11 wherein said reference signal generating means comprises a rotatable member drivenly connected to said motor, a stationary pick-off disposed in proximity to said rotatable member and a plurality of portions on said rotatable member each operable to produce an electrical reference signal in said pick-off when moved past the pick-off.

13. An alarm system according to claim 12 wherein the portions on the shutter are arranged in sets each corresponding to a reflective surface, the relative positions of the portions in each set corresponding to the relative positions of the stationary reflectors in each scanning path.

14. An alarm protection system for a space bounded in part by two surfaces comprising an alarm, a radiation source associated with one surface, means for deriving from said source a beam of radiation of narrow width, a motor, scanning means drivenly connected to said motor to cause said derived beam to follow a scanning path, a plurality of stationary reflectors associated with the other of said surfaces and disposed in said scannnig path to reflect radiation when illuminated by said beam, a radiation sensitive detector disposed adjacent said source and in the path of radiation reflected from said stationary reflectors to provide an electrical output signal when illuminated with reflected radiation, reference signal generating means drivenly connected to said motor and operable to provide an electrical output signal each time said beam is directed towards one of said stationary reflectors by said scanning means and alarm initiating means electrically connected to the output of said detector and said reference signal generating means to initiate said alarm upon the occurrence of a reference signal in the absence of a detector output signal.

15. An alarm protection system for a space bounded by two end surfaces and a base surface transverse thereof comprising an alarm, a radiation source associated with one of said end surfaces, means for deriving from said source a beam of radiation of narrow width, a motor, scanning means drivenly connected to said motor to cause said derived beam to follow a scanning path, a first set of stationary reflectors associated with said one end surface and disposed in said scanning path to reflect radiation towards said other end surface, a second set of stationary reflectors associated with the other of said end surfaces and arranged each to be illuminated by radiation reflected from an associated reflector of said first set, a radiation sensitive detector disposed in the path of radiation reflected from the reflectors of said second set to provide an electrical output signal when illuminated with reflected radiation, reference signal generating means drivenly connected to said motor and operable to provide an electrical output signal each time said beam is directed towards one of said stationary reflectors of said first set by said scanning means and alarm initiating means electrically connected to the output of said detector and said reference signal generating means to initiate said alarm upon the occurrence of a reference signal in the absence of a detector output signal.

16. An alarm protection system for a space bounded by two end surfaces and a base surface transverse thereof comprising an alarm, a radiation source associated with said base surface and one of said end surfaces, means for deriving from said source two oppositely directed beams of radiation of narrow width, a motor drivingly connected to said beam deriving means to cause each to follow a scanning path, a first set of stationary reflectors associated with said one end surface and disposed in the scanning path of each beam to reflect radiation towards said other end surface, a second set of stationary reflectors associated with said other end surface and arranged each to be illuminated by radiation reflected from an associated one of the reflectors in said first set, a radiation sensitive detector associated with said other end surface and disposed in the path of radiation reflected from the reflectors in said second set to provide an electrical output signal when illuminated with reflected radiation, reference signal generating means drivenly connected to said motor and operable to provide an electrical output signal each time said beam is directed towards one of said stationary reflectors in said first set by said signal means and alarm initiating means electrically connected to the output of said detector and said reference signal generating means to initiate said alarm upon the occurrence of a reference signal in the absence of a detector output signal.

References Cited in the file of this patent

UNITED STATES PATENTS

| | | |
|---|---|---|
| 2,227,147 | Lindsay | Dec. 31, 1940 |
| 2,269,340 | Gulliksen | Jan. 6, 1942 |
| 2,468,042 | Cranberg | Apr. 26, 1949 |
| 2,493,543 | Merchant | Jan. 3, 1950 |
| 2,506,946 | Walker | May 9, 1950 |
| 2,731,621 | Sontheimer | Jan. 17, 1956 |
| 2,912,683 | Bagno | Nov. 10, 1959 |
| 2,922,992 | Witcher | Jan. 26, 1960 |